United States Patent
Buchanan

[11] Patent Number: 5,856,015
[45] Date of Patent: Jan. 5, 1999

[54] GLAZE FOR REFRACTORY MATERIALS

[75] Inventor: Fraser James Buchanan, Tadcaster, United Kingdom

[73] Assignee: Cookson Matthey Ceramics & Materials Limited, London, United Kingdom

[21] Appl. No.: 666,460
[22] PCT Filed: Dec. 16, 1994
[86] PCT No.: PCT/GB94/02749
§ 371 Date: Aug. 23, 1996
§ 102(e) Date: Aug. 23, 1996
[87] PCT Pub. No.: WO95/18076
PCT Pub. Date: Jul. 6, 1995

[30] Foreign Application Priority Data
Dec. 29, 1993 [GB] United Kingdom ............ 9326526

[51] Int. Cl.⁶ ..................... C04B 8/18; B32B 17/06
[52] U.S. Cl. ............... 428/426; 428/472; 501/18; 501/19; 501/20; 501/21; 501/24
[58] Field of Search .................. 501/19, 18, 20, 501/24, 14, 21, 153, 154; 428/426, 472

[56] References Cited

U.S. PATENT DOCUMENTS

| | | |
|---|---|---|
| 3,348,929 | 10/1967 | Valtschev et al. . |
| 3,547,098 | 12/1970 | Lee .......................... 501/24 |
| 4,224,074 | 9/1980 | Reade ....................... 501/25 |
| 4,260,662 | 4/1981 | Wratil ...................... 501/18 |
| 4,340,645 | 7/1982 | O'Conor .................... 501/20 |
| 4,588,700 | 5/1986 | Reven ....................... 501/14 |
| 4,717,424 | 1/1988 | Wilfinger et al. . |
| 4,814,298 | 3/1989 | Nelson et al. ............... 501/17 |
| 5,252,521 | 10/1993 | Roberts ..................... 501/17 |
| 5,264,398 | 11/1993 | Thometzek et al. .......... 501/21 |
| 5,306,674 | 4/1994 | Ruderer et al. ............. 501/70 |
| 5,362,687 | 11/1994 | Tokunaga ................... 501/21 |
| 5,547,749 | 8/1996 | Chiba et al. ................ 428/323 |

FOREIGN PATENT DOCUMENTS

| | | |
|---|---|---|
| 0007131 | 1/1980 | European Pat. Off. . |
| 0125076 | 11/1984 | European Pat. Off. . |
| 0206140 | 1/1988 | European Pat. Off. . |
| 0252621 | 1/1988 | European Pat. Off. . |
| 1544794 | 4/1979 | United Kingdom . |

OTHER PUBLICATIONS

Chemical Abstracts, vol. 112, No. 6, Feb. 5, 1990, No. 41222y, "Dual–Phase Vitreous Enamels . . . ".

Primary Examiner—Karl Group
Attorney, Agent, or Firm—Watson Cole Grindle Watson, P.L.L.C.

[57] ABSTRACT

A glaze composition for refractory materials includes 30 to 80% by weight of at least one lead-free and barium-free borosilicate, borophosphate or phosphate glass frit having a dilatometric softening point of below 600° C.; 2 to 30% by weight of aluminium powder or an aluminium alloy powder; 2 to 30% by weight of silicon powder or silicon alloy powder, up to 10% by weight of an inhibitor; and optionally a refractory filler, a clay or other additives. The glaze composition is of particular use as a glaze for carbon containing refractory materials such as submerged entry nozzles and graphite electrodes.

25 Claims, No Drawings

GLAZE FOR REFRACTORY MATERIALS

BACKGROUND OF THE INVENTION

1. Field of the Invention

The present invention relates to a glaze for refractory materials and, in particular, to a glaze for carbon-containing refractory materials.

2. The Prior Art

Refractories used in the continuous casting of steel often contain a percentage of elemental carbon, normally in the form of flake graphite. The inclusion of elemental carbon serves to protect the refractory from attack and erosion by molten metals and the accompanying slags. It also contributes towards the high thermal shock resistance required in certain applications. However, elemental carbon is itself susceptible to air oxidation at temperatures above 500° C. Therefore, during preheat and casting operations, the refractory must be protected from the atmosphere if extended life of the component is required. An example of a component which requires extended oxidation protection is the submerged entry nozzle (SEN). This must typically survive preheat times of 2–3 hours at temperatures as high as 1400° C. and casting times of up to 5 hours at temperatures approaching the melting point of steel.

EP-A-0252621 discloses a method of protecting an electric arc furnace graphite electrode with particulate matter comprising 35–70% by weight of a refractory filler, 20–40% by weight of a graphite-wetting, fusible material and 10–25% by weight of a metal or metalloid oxidisable to a refractory oxide whilst the electrode is at an elevated temperature such that the metal or metalloid oxidises and forms a coating adhering to the side of the electrode. The preferred metal for use is aluminium, whilst the preferred refractory filler is silicon carbide and the preferred graphite-wetting fusible material is a boron compound or a boron-containing glass. The specification teaches that the particulate matter is sprayed onto the hot graphite electrode, for example using the spraying apparatus as disclosed in EP-A-0070100.

Using dry powder spraying methods, it is difficult to obtain an even coating of the refractory composition onto the graphite electrodes and expensive spraying equipment is required. Furthermore, dry powder spraying methods are not particularly suitable for coating complex geometries, for example the interiors of tubes. The refractory compositions as disclosed in EP-A-0252621 are not designed for use as aqueous suspensions since the boron oxide would be very soluble and the lack of any suspension agent means that it would not form a stable glaze slip.

U.S. Pat. No. 4,260,662 is directed to a composition for the enamelling of metal parts, such as heat exchangers and exhaust systems. The composition disclosed comprises 30–60% by weight of a specified frit, 5 to 60% by weight of aluminium powder, optionally silicon, chromium trioxide, zirconium silicate, copper oxide and bentonite, and is applied as an aqueous slip. Evolution of hydrogen, by the contact of aluminium with water, is avoided by the particular nature of the frit used which contains very large quantities of boron trioxide.

SUMMARY OF THE INVENTION

We have now developed a glaze composition for application from aqueous suspensions which contains aluminium powder and silicon powder but which does not react significantly with the water, whereby the evolution of hydrogen is prevented. The composition provides oxidation protection to carbon-containing materials during high temperature use.

Accordingly, in one aspect the present invention provides a glaze composition for refractory materials which comprises:

|  | % By Weight |
|---|---|
| at least one lead free and barium free borosilicate, borophosphate or phosphate glass frit having a dilatometric softening point of below 600° C. | 30 to 80 |
| aluminium powder or an aluminium alloy powder | 2 to 30 |
| silicon powder or silicon alloy powder | 2 to 30 |
| inhibitor | up to 2 |
| refractory filler | 0 to 20 |
| clay | 0 to 20 |
| optional additives | 0 to 10 |

In another aspect, the present invention provides a glaze slip composition which comprises an aqueous suspension of a glaze composition comprising

|  | Parts By Weight |
|---|---|
| at least one lead free and barium free borosilicate, borophosphate or phosphate glass frit having a dilatometric softening point of below 600° C. | 30 to 80 |
| aluminium powder or an aluminium alloy powder | 2 to 30 |
| silicon powder or silicon alloy powder | 2 to 30 |
| refractory filler | 0 to 20 |
| clay | 0 to 20 |

The glaze composition from which the aqueous suspension is formed, or the aqueous phase of the suspension, containing up to 10 parts by weight, based on the weight of the glaze composition, of an inhibitor and 0 to 10 parts by weight of optional additives.

In order to prevent the aluminium powder or aluminium alloy powder present in the glaze compositions of the present invention reacting with water when the glaze composition is formed into a glaze slip composition for application to the refractory surface which is to be coated, an inhibitor is included in the glaze composition or added to the aqueous glaze slip formulation. It will be understood that the inhibitor included in the glaze composition may either be included in the bulk composition, or included in the form of a surface pre-treatment of the aluminium powder.

Suitable inhibitors for use in the present invention are maleic anhydride, succinic acid, polyacrylic acid, boric acid, sodium metasilicate, sodium dihydrogen phosphate, sodium triphosphate or zinc chloride, preferably sodium triphosphate. The inhibitor will be used in a positive amount of up to 10% by weight, preferably up to 2% by weight, based on the weight of the dry glaze composition, the particular amount depending upon the inhibitor selected and upon the amount of aluminium powder or aluminium alloy powder in the composition. If the inhibitor is added to the aqueous glaze slip formulation it will also be included in a positive amount of up to 10 parts by weight, preferably up to 2 parts by weight, based upon the weight of the glaze composition used to form the aqueous glaze slip composition.

The use of an inhibitor prevents the evolution of hydrogen from the aqueous glaze slip compositions and also renders these compositions storage stable. Furthermore, bubbling of the compositions on application to a refractory surface is avoided, thus assisting in the formation of an even coating on the refractory material The glaze composition of the present invention comprises from 30–80%, preferably from 40–70%, more preferably from 50–65% by weight of at least one lead free and barium free borosilicate, borophosphate or phosphate glass frit having a dilatometric softening point below 600° C. It is important that the glass frit or frits used in the present invention do not contain lead oxide or barium oxide since the presence of such toxic materials is to be avoided. Furthermore, there is an added problem with lead since the presence of lead oxide would give rise to problems when the refractory material coated with the glaze composition is subjected to high temperatures and lead volatilized from the glaze. Whilst it is preferred to use in the glaze composition of the present invention a pre-formed glass in powdered form, it is also possible to use the constituent oxides of the glass system, although the use of such oxides may give rise to gas formation on heating. It will be understood that a mixture of glass frits may be used, as desired. The borosilicate, borophosphate or phosphate glass frit used in the present invention, or the borosilicate, borophosphate or phosphate glass which is formed by the component oxides, has a dilatometric softening point of below 600° C., preferably a dilatometric softening point of below 550° C. During heating of a refractory material coated with the glaze composition, the glass will soften and fuse at a low temperature before significant oxidation of the refractory material has occurred.

The glaze composition includes from 2–30%, preferably from 5–30% by weight of aluminium powder or an aluminium alloy powder therein, more preferably from 10–20% by weight of aluminium powder or aluminium alloy powder. The aluminium powder or aluminium alloy powder preferably has a particle size in the range of from 1 to 250 $\mu$m, more preferably from 10–200 $\mu$m, still more preferably 10–50 $\mu$m. Particles from the higher end of the range quoted are suitable for use when thicker coatings of the glaze compositions are intended.

The glaze composition of the present invention includes silicon powder or silicon alloy powder in an amount of from 2–30%, preferably from 5–30% by weight, more preferably 10–20% by weight. The silicon powder or silicon alloy powder preferably has a particle size in the range of from 1 to 250 $\mu$m, more preferably from 10–200 $\mu$m, still more preferably in the range of from 10–50 $\mu$m. Particles from the higher end of the range quoted are suitable for use when thicker coatings of the glaze compositions are intended. A proportion of up to 5% by weight of the silicon powder or silicon alloy powder may be replaced by a metal having a melting point of above 1400° C., a metal such as titanium or zirconium being preferred.

It is to be understood that the term "powder" as used herein is intended also to cover flake material.

The combination of aluminium and silicon in the glaze compositions of the invention prevents the coating from flowing off and exposing the substrate to which it is applied. The combined addition of aluminium and silicon helps to make the coating integral and increases the viscosity of the coating as the temperature is raised during use. The combined use of aluminium and silicon provides better results than using aluminium or silicon alone. In particular, a better glaze structure is obtained which is more glossy and has fewer pores than a similar coating in which one only of aluminium or silicon is used.

The glaze compositions of the present invention optionally include therein a refractory filler and/or a clay. The refractory filler may be, for example, alumina, silica, or a carbide or nitride of silicon, tungsten, boron or zirconium.

The clay, when present, improves the rheology of a glaze slip prepared from the glaze compositions of the invention. Many clays are traditionally used in the formation of glazes for the tableware industry and any such clays may be used in the present invention. The preferred range for each of the refractory filler and the clay, when used, is from 5–10% by weight of the composition. The glaze compositions may also include other optional additives such as a suspension agent, a hardener, a binder and/or a surfactant in an amount of 0 to 10% by weight.

The present invention also includes within its scope a method of protecting an article formed of a refractory material which method comprises coating the surface of the article with a glaze slip composition as above defined. The coating may be applied to the composition by dip coating, flood coating, spray coating, electrostatic spray coating or brushing. It will be appreciated by those skilled in the art that the aqueous glaze slip composition may optionally include additives such as a suspension agent, a hardener, a binder and/or a surfactant.

During heating of an article coated in accordance with the method of the invention the glass will soften and fuse at a low temperature before significant oxidation of the refractory material has occurred. The other components of the coating composition act to stabilise the coating and prevent it from becoming too fluid as the temperature is raised and preventing substrate exposure. The coating also provides a barrier layer to assist in preventing oxygen ingress.

The glaze compositions of the present invention are particularly useful for coating carbon containing refractory materials such as submerged entry nozzles (SEN), submerged entry shrouds, ladle shrouds, stopper rods, graphite electrodes, or other components used in the steel and metallurgical industry.

The present invention will be further described with reference to the following non-limiting Examples in which percentages are by weight unless otherwise stated.

The glass compositions which are used in the Examples have the following compositions:

| Component | Glass A wt % | Glass B wt % | Glass C wt % | Glass D wt % | Glass E wt % | Glass F wt % |
| --- | --- | --- | --- | --- | --- | --- |
| $SiO_2$ | 31.43 | 27.41 | 59.32 | 33.55 | — | 35.0 |
| $B_2O_3$ | 30.62 | 31.29 | 21.58 | 16.55 | 8.18 | 20.0 |
| $P_2O_5$ | — | — | — | — | 40.92 | — |
| $Li_2O$ | — | — | — | 0.99 | 4.23 | — |
| $Na_2O$ | 21.07 | 19.45 | 10.69 | — | 22.61 | 10.0 |
| $K_2O$ | 4.64 | 3.75 | 2.45 | — | — | — |
| $Al_2O_3$ | 7.56 | 13.84 | 5.12 | 7.27 | 24.06 | 10.0 |
| $Bi_2O_3$ | — | — | — | 41.64 | — | — |
| CaO | 3.45 | 3.16 | 0.65 | — | — | 19.0 |
| MgO | 0.54 | 0.39 | 0.19 | — | — | — |
| ZrO | 0.69 | 0.71 | — | — | — | 6.0 |

The particle sizes given in the Examples are $D_{50}$ values on a Malvern Mastersizer.

EXAMPLE 1

The following powder mixture was prepared:

| | |
| --- | --- |
| Glass A (dilatometric softening point 510° C., 18 $\mu$m) | 60% |
| Aluminium powder (35 $\mu$m) pretreated with 1% sodium triphosphate | 10% |

| | |
|---|---|
| Silicon powder (30 μm) | 20% |
| Ball clay | 10% |

0.25% of Peptapon 52 (Zschimmer & Schwarz) was added to the mixture as a binder/suspension agent and the mixture made into an aqueous suspension by water addition. Samples were dipped into this suspension to give coating thicknesses, after drying, of 0.3 to 0.4 mm. The materials tested were alumina-graphite, zirconia-graphite and magnesia-graphite.

Experimental tests were carried out to simulate the typical gas-burner preheat conditions experienced by an SEN in use. After tests of 2 hours duration the coatings on all three substrates remained adherent with no significant oxidation of the underlying graphite.

Tests were also carried out in an electric furnace. The samples were heated from room temperature to 1500° C. for a period of 1 hour with heating and cooling rates of 10° C./min being employed. The weight losses were recorded and compared with measurements for unglazed samples. The results were as follows:

| | Weight Loss % | |
|---|---|---|
| | Glazed | Unglazed |
| Alumina-Graphite | 2.7 | 22.7 |
| Zirconia-Graphite | 2.4 | 14.9 |
| Magnesia-Graphite | 6.0 | 19.4 |

EXAMPLE 2

The following powder mixture was prepared:

| | |
|---|---|
| Glass A (dilatometric softening point 510° C., 18 μm) | 60% |
| Pretreated aluminium powder (35 μm) | 10% |
| Silicon powder (10 μm) | 20% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 3

The following powder mixture was prepared:

| | |
|---|---|
| Glass A dilatometric softening point 510° C., 18 μm) | 60% |
| Pretreated aluminium powder (flake, 35 μm) | 10% |
| Silicon powder (30 μm) | 20% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 4

The following powder mixture was prepared:

| | |
|---|---|
| Glass A (dilatometric softening point 510° C., 18 μm) | 60% |
| Pretreated aluminium powder (35 μm) | 5% |
| Silicon powder (30 μm) | 20% |
| Titanium powder (100 μm) | 5% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 5

The following powder mixture was prepared:

| | |
|---|---|
| Glass A (dilatometric softening point 510° C., 18 μm) | 55% |
| Pretreated aluminium powde (35 μm) | 8% |
| Silicon powder (30 μm) | 20% |
| Silicon carbide (18 μm) | 8% |
| Ball clay | 9% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 6

The following powder mixture was prepared:

| | |
|---|---|
| Glass A (dilatometric softening point 510° C., 18 μm) | 50% |
| Pretreated aluminium powder (35 μm) | 10% |
| Silicon powder (30 μm) | 20% |
| Alumina (7 μm) | 10% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 7

The following powder mixture was prepared:

| | |
|---|---|
| Glass A (dilatometric softening point 510° C., 18 μm) | 59% |
| Pretreated aluminium powder (35 μm) | 7% |
| Silicon powder (30 μm) | 14% |
| Ball clay | 20% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 8

The following powder mixture was prepared:

| | |
|---|---|
| Glass A (dilatometric softening point 510° C., 18 μm) | 50% |
| Pretreated aluminium powder (35 μm) | 10% |
| Silicon powder (30 μm) | 20% |
| Silica (28 μm) | 10% |
| Ball clay | 10% |

A glaze slip composition was prepared according to the teaching of Example 1. Water was added to this composition to give a specific gravity of 1.7 gcm$^{-3}$. The glaze slip composition was stored for one month. No significant swelling of the glaze or foaming was detected.

The glaze slip composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

Tests were also carried out in an electric furnace. Samples were placed in a furnace preheated to 700° C. for 3 hours then removed. Further samples were placed in a furnace preheated to 1200° C. for 3 hours then removed. The weight losses were recorded and compared with measurements for unglazed samples. The results were as follows:

| | Weight Loss % | |
|---|---|---|
| | Glazed | Unglazed |
| 3 hours, 700° C.: | | |
| Alumina-Graphite | 1.56 | 15.68 |
| Zirconia-Graphite | 1.21 | 9.55 |
| Magnesia-Graphite | 0.73 | 16.3 |
| 3 hours, 1200° C.: | | |
| Alumina-Graphite | 0.64 | 23.7 |
| Zirconia-Graphite | −0.34 | 15.1 |
| Magnesia-Graphite | 0.01 | 19.3 |

EXAMPLE 9

The following powder mixture was prepared:

| | |
|---|---|
| Glass A (dilatometric softening point 510° C., 18 μm) | 40% |
| Pretreated aluminium powder (35 μm) | 10% |
| Silicon powder (30 μm) | 20% |
| Boron carbide (48 μm) | 20% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 10

The following powder mixture was prepared:

| | |
|---|---|
| Glass A (dilatometric softening point 510° C., 18 μm) | 60% |
| Pretreated aluminium-silicon powder (35 μm, 12% Si) | 10% |
| Silicon powder (30 μm) | 20% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 11

The following powder mixture was prepared:

| | |
|---|---|
| Glass A (dilatometric softening point 512° C., 20 μm) | 45% |
| Glass C (dilatometric softening point 550° C., 20 μm) | 15% |
| Aluminium powder (35 μm,) | 10% |
| Silicon powder (30 μm) | 20% |
| Ball clay | 10% |

0.25% of Peptapon 52 (Zschimmer & Schwarz) was added to the mixture as a binder/suspension agent and the mixture made into an aqueous suspension with water containing 0.1% sodium triphosphate based on the weight of the dry glaze composition. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 12

The following powder mixture was prepared:

| | |
|---|---|
| Glass A (dilatometric softening point 510° C., 18 μm) | 50% |
| Pretreated aluminium powder (35 μm) | 10% |
| Silicon powder (30 μm) | 20% |
| Silica (28 μm) | 20% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 13

The following powder mixture was prepared:

| | |
|---|---|
| Glass A (dilatometric softening point 510° C., 18 μm) | 45% |

-continued

| | |
|---|---|
| Aluminium powder (35 µm) | 5% |
| Silicon powder (30 µm) | 30% |
| Silica (28 µm) | 10% |
| Ball clay | 10% |

0.25% of Peptapon 52 (Zschimmer & Schwarz) was added to the mixture as a binder/suspension agent and the mixture made into an aqueous suspension with water containing 0.1% sodium triphosphate based on the weight of the dry glaze composition. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 14

The following powder mixture was prepared:

| | |
|---|---|
| Glass A (dilatometric softening point 510° C., 18 µm) | 50% |
| Aluminium powder (35 µm) | 30% |
| Silicon powder (30 µm) | 5% |
| Silica (28 µm) | 10% |
| Ball clay | 5% |

0.25% of Peptapon 52 (Zschimmer & Schwarz) was added to the mixture as a binder/suspension agent and the mixture made into an aqueous suspension with water containing 0.25% sodium triphosphate based on the weight of the dry glaze composition. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 15

The following powder mixture was prepared:

| | |
|---|---|
| Glass D (dilatometric softening point 480° C., 3 µm) | 71% |
| Aluminium powder (35 µm) | 6.5% |
| Silicon powder (30 µm) | 12.9% |
| Silica (28 µm) | 3.2% |
| Ball clay | 6.4% |

0.25% of Peptapon 52 (Zschimmer & Schwarz) was added to the mixture as a binder/suspension agent and the mixture made into an aqueous suspension with water containing 0.1% sodium triphosphate based on the weight of the dry glaze composition. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 16

The following powder mixture was prepared:

| | |
|---|---|
| Glass D (dilatometric softening point 480° C., 3 µm) | 20% |
| Glass A (dilatometric softening point 510° C., 18 µm) | 41% |
| Aluminium powder (35 µm) | 7.5% |
| Silicon powder (30 µm) | 21.5% |
| Ball clay | 10% |

0.25% of Peptapon 52 (Zschimmer & Schwarz) was added to the mixture as a binder/suspension agent and the mixture made into an aqueous suspension with water containing 0.1% sodium triphosphate based on the weight of the dry glaze composition. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 17

The following powder mixture was prepared:

| | |
|---|---|
| Glass E (dilatometric softening point 370° C., 7.5 µm) | 30% |
| Pretreated aluminium powder (35 µm) | 10% |
| Silicon powder (30 µm) | 20% |
| Silica (28 µm) | 30% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 18

The following powder mixture was prepared:

| | |
|---|---|
| Glass A (dilatometric softening point 510° C., 18 µm) | 50% |
| Aluminium powder (flake, 223 µm) | 10% |
| Silicon powder (30 µm) | 20% |
| Silica (28 µm) | 10% |
| Ball clay | 9.9% |
| Sodium triphosphate | 0.1% |

A glaze slip composition was prepared according to the teaching of Example 1. Water was added to the glaze composition to give a specific gravity of 1.7 gcm$^{-3}$ and the glaze stored for one month. No significant swelling of the glaze or foaming of the composition.

This composition was applied to substrates of alumina-graphite and zirconia-graphite by dipping as in Example 1 and subjected to a 30 min gas-burner test, simulating pre-heat conditions. The coatings on both substrates remained adherent on both substrates. Oxidation of the underlying graphite occurred in some isolated areas.

EXAMPLE 19

The following powder mixture was prepared:

| | |
|---|---|
| Boric acid | 35.9% |
| Potassium feldspar | 10.2 |
| Pretreated aluminium powder (35 $\mu$m) | 16.9% |
| Silicon powder (30 $\mu$m) | 8.4% |
| Silica (28 $\mu$m) | 20.2% |
| Ball clay | 8.4% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

EXAMPLE 20

The following powder mixture was prepared:

| | |
|---|---|
| Glass A (dilatometric softening point 510° C., 18 $\mu$m) | 54% |
| Aluminium powder (35 $\mu$m) | 6% |
| Silicon powder (30 $\mu$m) | 23% |
| Silica (28 $\mu$m) | 8.5% |
| Ball clay | 8.5% |

0.50% Dispex N100 (Allied Colloids) and 2.0% Paraloid DP 2903 (Rohm & Haas) were added to the mixture as binder/suspension agents and the mixture was made into an aqueous suspension with water containing 0.1% sodium triphosphate based on the weight of the dry glaze composition. This composition was applied to substrates of alumina-graphite and zirconia-graphite by dipping as in Example 1 and subjected to a 30 min gas-burner test, simulating pre-heat conditions. The coatings on both substrates remained adherent with no significant oxidation of the underlying graphite.

A portion of the glaze slip composition was stored for one month. No significant swelling of the glaze or foaming of the composition occurred.

Tests were also carried out in an electric furnace. Samples of glazed zirconia-graphite were placed in the furnace held at 700° C. for a period of 3 hours. The weight loss was measured as 2.2%.

EXAMPLE 21

The following powder mixture was prepared:

| | |
|---|---|
| Glass F (dilatometric softening point 585° C., 11.5 $\mu$m) | 60% |
| Pretreated aluminium powder (35 $\mu$m) | 10% |
| Silicon powder (30 $\mu$m) | 20% |
| Ball clay | 10% |

A glaze slip composition was prepared according to the teaching of Example 1. This composition was applied to substrates of alumina-graphite and zirconia-graphite by dipping as in Example 1 and subjected to a 30 min gas-burner test, simulating pre-heat conditions. The coatings on both substrates remained adherent with slight oxidation of the underlying graphite in regions away from the gas flame.

I claim:
1. A method of protecting an article made of a refractory material, which method comprises (a) providing a glaze slip composition which consists essentially of:

| | % By Weight |
|---|---|
| at least one lead free and barium free borosilicate, borophosphate or phosphate glass frit having a dilatometric softening point of below 600° C. | 30 to 80 |
| aluminium powder or an aluminium alloy powder | 2 to 30 |
| silicon powder or silicon alloy powder | 2 to 30 |
| inhibitor | up to 10 |
| refractory filler | 0 to 20 |
| clay | 0 to 20 | and (b) coating said glaze slip composition onto a surface of said refractory article.

2. A method as claimed in claim 1, wherein the coating is applied by a method selected from the group consisting of dip coating, flood coating, spray coating, electrostatic spray coating and brushing.

3. A method as claimed in claim 1, wherein the coated article is heated whereby the coating softens, fuses and remains adherent to the surface of the article and provides a barrier layer to assist in preventing oxygen ingress.

4. A method as claimed in claim 1, wherein said article is made of a carbon-containing refractory material.

5. A method as claimed in claim 1, wherein said glaze slip composition comprises water.

6. An article of manufacture which comprises a refractory body covered at least in part by a coating formed from a glaze slip composition consisting essentially of:

| | % By Weight |
|---|---|
| at least one lead free and barium free borosilicate, borophosphate or phosphate glass frit having a dilatometric softening point of below 600° C. | 30 to 80 |
| aluminium powder or an aluminium alloy powder | 2 to 30 |
| silicon powder or silicon alloy powder | 2 to 30 |
| inhibitor | up to 10 |
| refractory filler | 0 to 20 |
| clay | 0 to 20 | said body being a submerged entry nozzle, a submerged entry shroud, a ladle shroud, or a stopper rod.

7. An article of manufacture as claimed in claim 6, wherein said glaze slip composition comprises from 40 to 70% by weight of at least one glass frit.

8. An article of manufacture as claimed in claim 6, wherein said glaze slip composition comprises from 5 to 30% by weight of aluminium powder or an aluminium alloy powder.

9. An article of manufacture as claimed in claim 8, wherein said glaze slip composition comprises from 10 to 20% by weight of aluminium powder.

10. An article of manufacture as claimed in claim 6, wherein the aluminium powder has a particle size in a range of from 10 to 200 $\mu$m.

11. An article of manufacture as claimed in claim 10, wherein the aluminium powder has a particle size in a range of from 10 to 50 $\mu$m.

12. An article of manufacture as claimed in claim 6, wherein said glaze slip composition comprises from 5 to 30% by weight of silicon powder or silicon alloy powder.

13. An article of manufacture as claimed in claim 12, wherein said glaze slip composition comprises from 10 to 20% by weight of silicon powder.

14. An article of manufacture as claimed in claim 6, wherein the silicon powder or silicon alloy powder has a particle size in a range of from 10 to 200 μm.

15. An article of manufacture as claimed in claim 14, wherein the silicon powder or silicon alloy powder has a particle size in a range of from 10 to 50 μm.

16. An article of manufacture as claimed in claim 6, wherein the glaze slip composition includes 0.1 to 10 wt % of an inhibitor for preventing aluminium powder or aluminium alloy powder from reacting with water selected from the group consisting of maleic anhydride, succinic acid, polyacrylic acid, boric acid, sodium metasilicate, sodium dihydrogen phosphate, sodium triphosphate and zinc chloride.

17. An article of manufacture as claimed in claim 6, wherein the glass frit in the glaze slip composition is replaced in the composition by a mixture of the oxide precursors therefor.

18. An article of manufacture as claimed in claim 6, wherein a part of the silicon powder or silicon alloy powder in the glaze slip composition is replaced by a metal having a melting point of about 1400° C.

19. An article of manufacture as claimed in claim 18, wherein the metal is titanium or zirconium.

20. An article of manufacture as claimed in claim 6, wherein the glaze slip composition includes a refractory filler selected from the group consisting of alumina, silica, silicon boride, silicon carbide, silicon nitride, tungsten boride, tungsten carbide, tungsten nitride, zirconium boride, zirconium carbide, zirconium nitride, boron carbide and boron nitride.

21. An article of manufacture as claimed in claim 6, wherein said coating completely covers said body.

22. An article of manufacture as claimed in claim 6, wherein said body is made of a carbon-containing refractory material.

23. An article of manufacture as claimed in claim 6, wherein said glaze slip composition comprises 10 to 30% by weight silicon powder or silicon alloy powder.

24. An article of manufacture as claimed in claim 6, wherein said glaze slip composition comprises 45 to 80% by weight of said glass frit.

25. An article of manufacture as claimed in claim 6, further including an effective amount of an additive selected from the group of a suspension agent, a hardener, a binder and a surfactant.

* * * * *